United States Patent [19]

Foster

[11] Patent Number: 4,504,254
[45] Date of Patent: Mar. 12, 1985

[54] BELT TENSIONER AND METHOD OF MAKING THE SAME

[75] Inventor: Randy C. Foster, Springfield, Mo.
[73] Assignee: Dayco Corporation, Dayton, Ohio
[21] Appl. No.: 402,441
[22] Filed: Jul. 28, 1982
[51] Int. Cl.³ .............................................. F16H 7/12
[52] U.S. Cl. .................................... 474/133; 474/135; 29/452
[58] Field of Search .................. 29/452; 474/133–135, 474/138; 267/140.4

[56] References Cited

U.S. PATENT DOCUMENTS 4,144,772  3/1979  Brackin et al. ................... 474/135
4,285,676  8/1981  Kraft .................................. 474/135

Primary Examiner—James A. Leppink
Assistant Examiner—Frank H. McKenzie, Jr.
Attorney, Agent, or Firm—Joseph V. Tassone

[57] ABSTRACT

A tensioner for a power transmission belt or the like that is adapted to be operated in an endless path and a method of making the same are provided, the tensioner comprising a support unit for being fixed relative to the belt, a belt engaging unit carried by the support unit and being movable relative thereto, the belt engaging unit including a lever arm having opposed ends, a polymeric spring unit being operatively associated with the support unit and the belt engaging unit for urging the belt engaging unit relative to the support unit and against the belt with a force to tension the belt, and a coiled mechanical spring also being operatively associated with the support unit and the belt engaging unit for urging the belt engaging unit relative to the support unit and against the belt with a force to tension the belt whereby the polymeric spring unit and the mechanical spring combine to define the tensioning force for the belt while the polymeric spring unit additionally tends to dampen the movement of the belt engaging unit relative to the support unit. The mechanical spring is substantially completely embedded in the polymeric spring unit so that the mechanical spring is substantially completely engaged and surrounded by the polymeric spring unit. The coiled mechanical spring has opposed ends with one of those ends extending out of the polymeric spring unit and being operatively interconnected to the lever arm intermediate the opposed ends thereof whereby the polymeric spring unit is operatively interconnected to the belt engaging unit solely by the one end of the mechanical spring.

16 Claims, 8 Drawing Figures

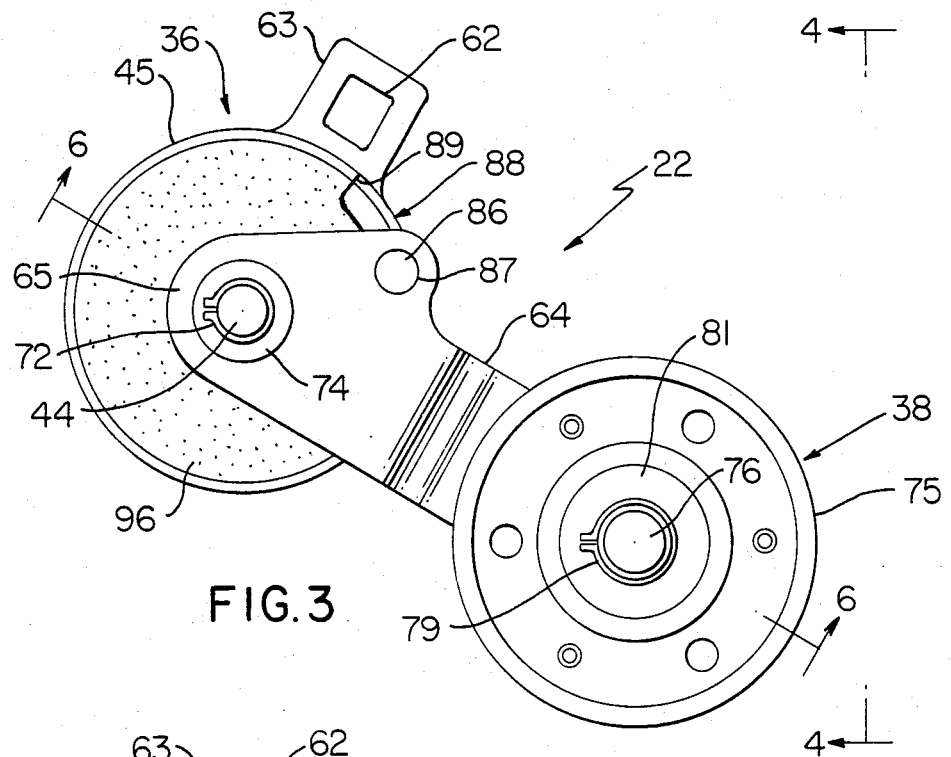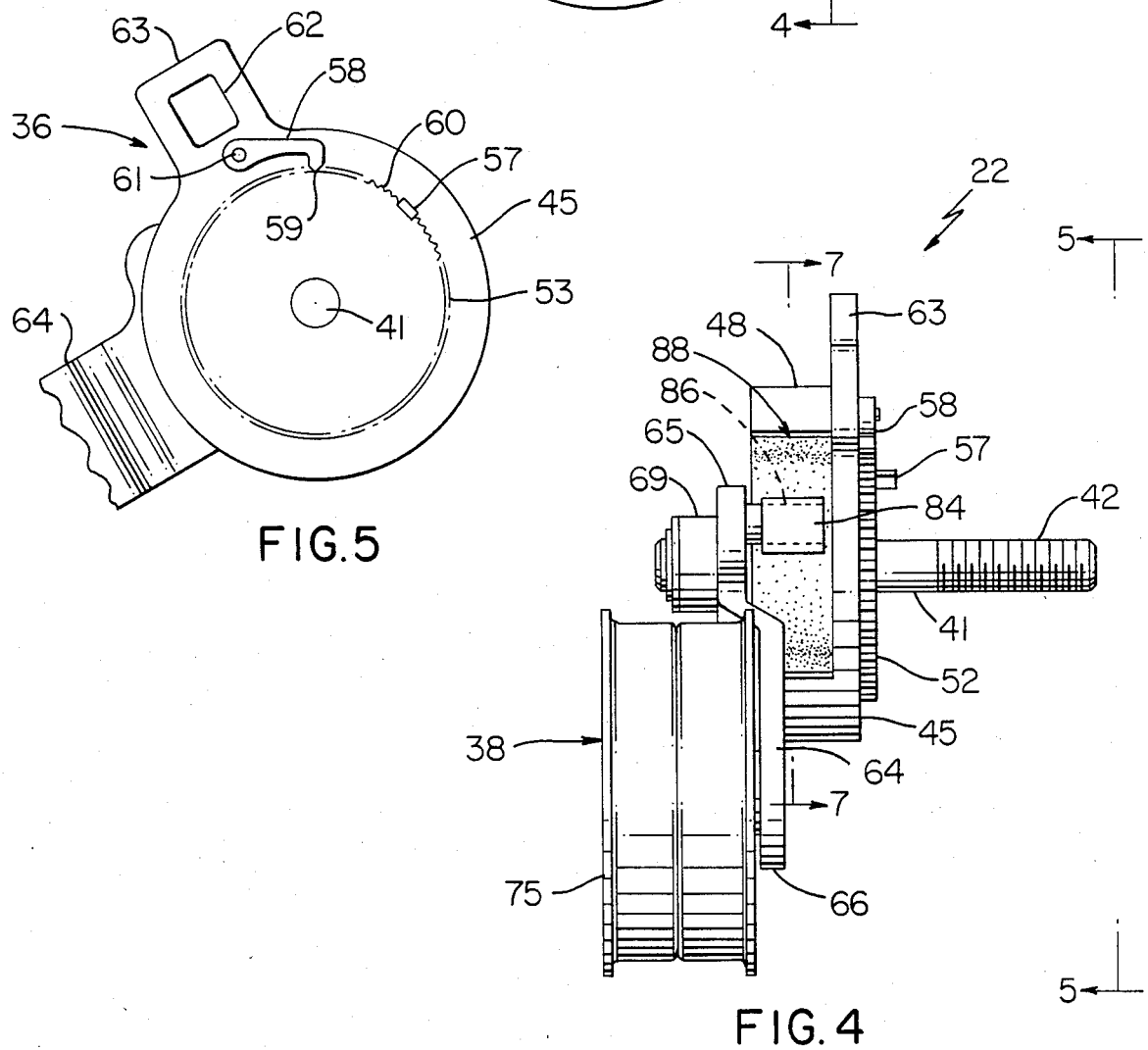

BELT TENSIONER AND METHOD OF MAKING THE SAME

BACKGROUND OF THE INVENTION

1. Field of the Invention

This invention relates to a tensioner for an endless power transmission belt or the like as well as to a method of making such a tensioner or the like.

2. Prior Art Statement

It is known to applicant to provide a tensioner for a power transmission belt or the like that is adapted to be operated in an endless path, the tensioner comprising a support means for being fixed relative to the belt, a belt engaging means carried by the support means and being movable relative thereto, the belt engaging means including a lever arm having opposed ends, polymeric spring means being operatively associated with the support means and the belt engaging means for urging the belt engaging means relative to the support means and against the belt with a force to tension the belt, and mechanical spring means also being operatively associated with the support means and the belt engaging means for urging the belt engaging means relative to the support means and against the belt with a force to tension the belt whereby the polymeric spring means and the mechanical spring means combine to define the tensioning force for the belt while the polymeric spring means additionally tends to dampen the movement of the belt engaging means relative to the support means, the mechanical spring means being at least partially embedded in the polymeric spring means. For example, see the copending patent application, Ser. No. 402,404, filed July 27, 1982, of Billy L. Speer et al.

It is also known from the published German patent application, No. 2,902,182, that a coiled mechanical spring means is also operatively associated with the support means and the belt engaging means for urging the belt engaging means relative to the support means and against the belt with a force to tension the belt whereby the polymeric spring means and the mechanical spring means combine to define the tensioning force for the belt while the polymeric spring means additionally tends to dampen the movement of the belt engaging means relative to the support means.

SUMMARY OF THE INVENTION

It is one feature of this invention to provide an improved tensioner for a power transmission belt or the like.

In particular, it is believed according to the teachings of this invention that a unique arrangement can be provided for the mechanical spring means and the polymeric spring means of a tensioner whereby the mechanical spring means can be interconnected to the lever arm of the belt engaging means intermediate the opposed ends thereof.

For example, one embodiment of this invention provides a tensioner for a power transmission belt or the like that is adapted to be operated in an endless path, the tensioner comprising a support means for being fixed relative to the belt, a belt engaging means carried by the support means and being movable relative thereto, the belt engaging means including a lever arm having opposed ends, polymeric spring means being operatively associated with the support means and the belt engaging means for urging the belt engaging means relative to the support means and against the belt with a force to tension the belt, and mechanical spring means also being operatively associated with the support means and the belt engaging means for urging the belt engaging means relative to the support means and against the belt with a force to tension the belt whereby the polymeric spring means and the mechanical spring means combine to define the tensioning force for the belt while the polymeric spring means additionally tends to dampen the movement of the belt engaging means relative to the support means. The mechanical spring means is at least partially embedded in the polymeric spring means and is operatively interconnected to the lever arm intermediate the opposed ends thereof.

It is also believed according to the teachings of this invention that a unique arrangement of the polymeric spring means and mechanical spring means of the tensioner can be utilized in such a manner that the polymeric spring means can be operatively interconnected to the belt engaging means solely by the mechanical spring means.

For example, another embodiment of this invention provides a tensioner for a power transmission belt or the like that is adapted to be operated in an endless path, the tensioner comprising a support means for being fixed relative to the belt, a belt engaging means carried by the support means and being movable relative thereto, polymeric spring means being operatively associated with the support means and the belt engaging means for urging the belt engaging means relative to the support means and against the belt with a force to tension the belt, and mechanical spring means also being operatively associated with the support means and the belt engaging means for urging the belt engaging means relative to the support means and against the belt with a force to tension the belt whereby the polymeric spring means and the mechanical spring means combine to define the tensioning force for the belt while the polymeric spring means additionally tends to dampen the movement of the belt engaging means relative to the support means. The mechanical spring means is at least partially embedded in the polymeric spring means and the polymeric spring means is operatively interconnected to the belt engaging means solely by the mechanical spring means.

Accordingly, it is an object of this invention to provide an improved tensioner for a power transmission belt or the like, the tensioner of this invention having one or more of the novel features of this invention as set forth above or hereinafter shown or described.

Another object of this invention is to provide an improved method of making a tensioner for a power transmission belt or the like, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 3 is an enlarged front view of the belt tensioner utilized in FIGS. 1 and 2.

FIG. 4 is a cross-sectional view taken on line 4—4 of FIG. 3.

FIG. 5 is a fragmentary view taken substantially on the line 5—5 of FIG. 4.

DESCRIPTION OF THE PREFERRED EMBODIMENT

Figure 1:
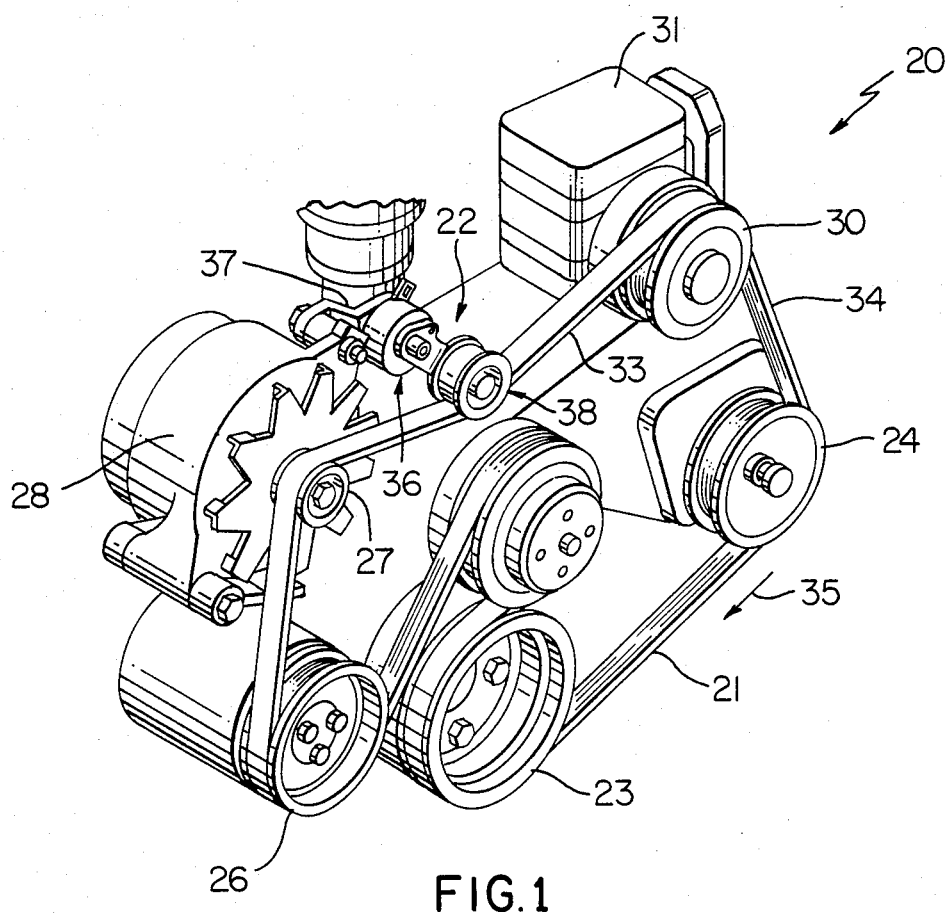
FIG. 1 is a fragmentary isometric view looking toward the front end of an automobile engine which utilizes the belt tensioner of this invention.

While the various features of this invention are hereinafter illustrated and described as providing a belt tensioner for a particular power transmission belt of a particular motor vehicle engine, it is to be understood that the various features of this invention can be utilized singly or in any combination thereof to provide a tensioner for other arrangements as desired.

Therefore, this invention is not to be limited to only the embodiment illustrated in the drawings, as the drawings are merely utilized to illustrate one of the wide variety of uses of this invention.

Figure 2:
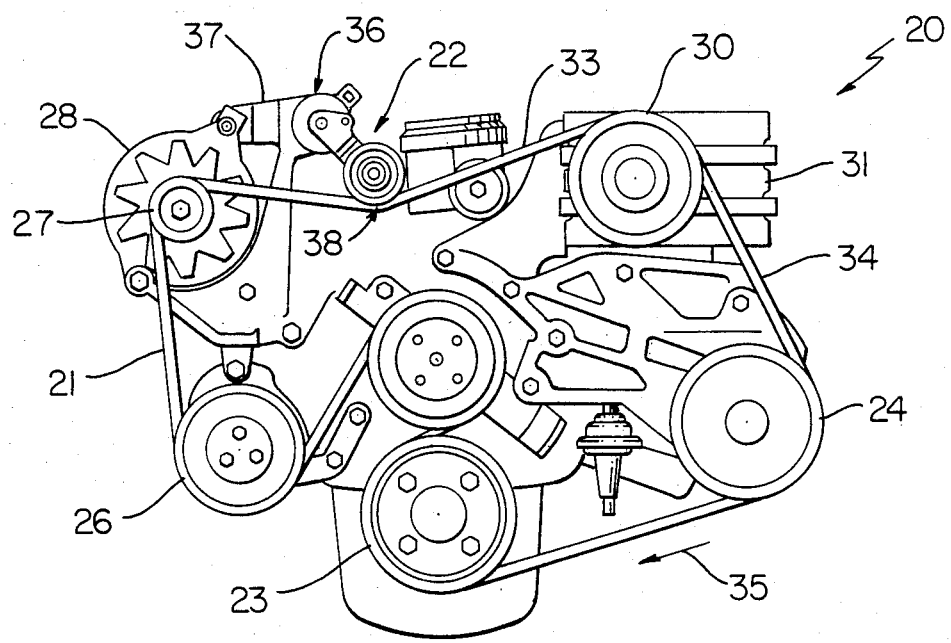
FIG. 2 is a view looking perpendicularly towards the front end of the automobile engine of FIG. 1.

Referring now to FIGS. 1 and 2, an automobile engine is generally indicated by the reference numeral 20 and utilizes an endless power transmission belt 21 for driving a plurality of driven accessories as hereinafter set forth, the improved belt tensioner of this invention being generally indicated by the reference numeral 22 and being utilized to provide a tensioning force on the belt 21 in a manner hereinafter set forth.

The endless power transmission belt 21 may be of any suitable type known in the art and is preferably made primarily of a polymeric material because it is believed that the unique features of the tensioner 22 of this invention readily permits the tensioner 21 to tension a belt having a polyester load-carrying cord in an efficient manner as hereinafter described.

The belt 21 is driven by a driving sheave 23 which is operatively interconnected to the crank shaft of the engine 20 in a manner well known in the art. The driving sheave 23 drives the belt 21 in an endless path and thereby drives a sheave 24 of a power steering device used in an automobile (not shown) utilizing the engine 20, a sheave 25 of an engine water pump, a sheave 26 of an air pump of a type used in an antipollution system for the engine 20, a sheave 27 of an engine electrical alternator 28 and a sheave 30 of a compressor 31 of an air conditioning system for the automobile utilizing the engine 20.

All of the driven accessories, through their sheaves 24, 25, 26, 27 and 30, impose a load on the belt 21. However, only the detailed description of the load being imposed by the compressor 31 and its sheave 30 on the belt 21 will be hereinafter described inasmuch as such load is generally of a comparatively high magnitude.

In particular, the compressor 31, upon being driven, creates a slack side 33 and a tight side 34 in the belt 21 upon turning on of the air conditioner system in the automobile, the slack side 33 and tight side 34 being produced since the belt is rotating clockwise as indicated by the arrow 35 in FIGS. 1 and 2.

The belt tight side 34 (and hence, slack side 33) varies in tightness, i.e., magnitude of tightness, in a cyclic manner and as a function of the inherent cyclic change in the loads imposed by the compressor 31. The cyclic change in load varies between greater extremes in applications where the compressor 31 is of a piston type. The cyclic load imposed by the compressor 31 has a tendency to cause the slack side 33 of the belt 21 to vibrate or oscillate.

In addition to such vibrations and oscillations of the belt 21, it is known that normal belt wear and heat variations in the engine compartment for the engine 20 produces variations in the length of the belt 21 that requires compensation for the same.

Thus, it is known that it is difficult to maintain a belt 21 under tension with a force required to insure nonslipping engagement and driving of the driven sheaves whereby numerous belt tensioners have been proposed and used heretofore in an effort to provide the required tension.

It is believed that the improved belt tensioner 22 of this invention will function in a manner to provide a proper tension and force on the belt 21 to overcome the aforementioned problems, namely, provide the required tension in the overall belt 21 as well as prevent any tendency of the belt to oscillate in an undesirable manner as a result of the cyclic load change imposed by the compressor 31.

As best illustrated in FIGS. 3–8, the improved belt tensioner 22 of this invention comprises a support means that is generally indicated by the reference numeral 36 and being adapted to be fixed in any suitable manner to a mounting bracket 37 of the engine 20 as illustrated in FIGS. 1 and 2.

A belt engaging means that is generally indicated by the reference numeral 38 is movable carried by the support means 36 in a manner hereinafter set forth and thereby forms part of the tensioner 22 of this invention.

The tensioner 22 has polymeric spring means that is generally indicated by the reference numeral 39 operatively associated with a support means 36 and the belt engaging means 38 for urging the belt engaging means 38 relative to the support means 36 and against the belt 21 with a force to tension the belt 21 in a manner hereinafter set forth.

The tensioner 22 also includes mechanical spring means that is generally indicated by the reference numeral 40 and that is also operatively associated with the support means 36 and the belt engaging means 38 for urging the belt engaging means 38 relative to the support means 36 and against the belt 21 with a force to tension the belt 21 in a manner hereinafter set forth whereby the polymeric spring means 39 and the mechanical spring means 40 combine to define the tensioning force for the belt 21 while the polymeric spring means 39 additionally tends to dampen the movement of the belt engaging means 38 relative to the support means 36 for the reasons fully set forth in the aforementioned copending patent application, Ser. No. 402,404, filed July 27, 1982 of Billy L. Speer et al whereby this copending patent application is being incorporated into this disclosure by this reference thereto.

The support means 36 includes a shaft-like member 41 having a threaded end 42 for passing through a suitable opening (not shown) in the mounting bracket 37 and receiving a suitable nut thereon for fastening the shaft 41 thereto in a manner hereinafter set forth, the shaft 41 having an enlarged cylindrical portion 43 disposed intermediate the threaded end 42 thereof and an opposed end 44 thereof as illustrated.

The support means 36 includes a cup-shaped housing member 45 having a closed end 46 and an open end 47 defined by an annular sidewall means 48, the closed end 46 having an opening 49 passing centrally therethrough so as to receive the shaft 41 therethrough in such a manner that the side 50 of the shaft enlargement 43 is adapted to abut against the inside surface 51 of the closed end wall 46 and be secured thereto in any suitable manner, such as by spot welding or the like, whereby the housing 45 and shaft 41 move in unison.

The support means 36 includes a disc-like member 52 having an opening 53 passing centrally therethrough to receive the shaft 41 therethrough in such a manner that the side 54 of the disc-like member 52 is adapted to be disposed in stacked relation against the outside surface 55 of the end wall 46 of the cup-shaped housing member 45 when the opposite side 56 of the disc-like member 52 is disposed against the mounting bracket 37 by the nut-like member (not shown) being threaded on the threaded end 42 of the shaft 41 to hold the support means 36 thereto.

The disc-like member 52 of the support means 36 is adapted to prevent rotational movement of the support means 36 relative to the mounting bracket 37 as well as permits adjustment relative thereto.

In particular, the disc-like member 52 has a rearwardly directed tang 57 for being received in a suitable opening (not shown) in the mounting bracket 37 when the side 56 there of is disposed against the mounting bracket 37 so as to prevent rotational movement of the disc-like member 56 relative to the shaft-like member 41. The housing member 45 is prevented from rotating relative to the thus held disc-like member 52 by having a pawl 58, FIG. 8, with its teeth 59 locked in peripheral teeth 60 of the disc-like member 52, the pawl 58 being urged in a locking direction by spring means (not shown) in a conventional manner and being pivotally mounted to the cup-shaped housing 45 by a pivot pin 61 in a manner well known in the art.

In this manner, once the support means 36 has been fastened to the mounting bracket 37 so that the disc-like member 52 is stacked thereagainst as well as against the housing 45 with its tang 57 in its locking opening in the mounting bracket 37, the rotational position of the housing 45 and, thus, of the shaft 41 can be controlled by the operator pivoting the pawl 58 so that the teeth 59 thereof are out of locking engagement with the teeth 60 and inserting a suitable tool within a cutout 62 in a tab extension 63 of the housing member 45 in order to cause rotation of the housing 45 and, thus, rotation of the shaft 41 secured thereto to control the amount of spring force being applied by the polymeric spring means 39 and mechanical spring means 40 on the belt engaging means 38 as will be apparent hereinafter.

Figure 6:
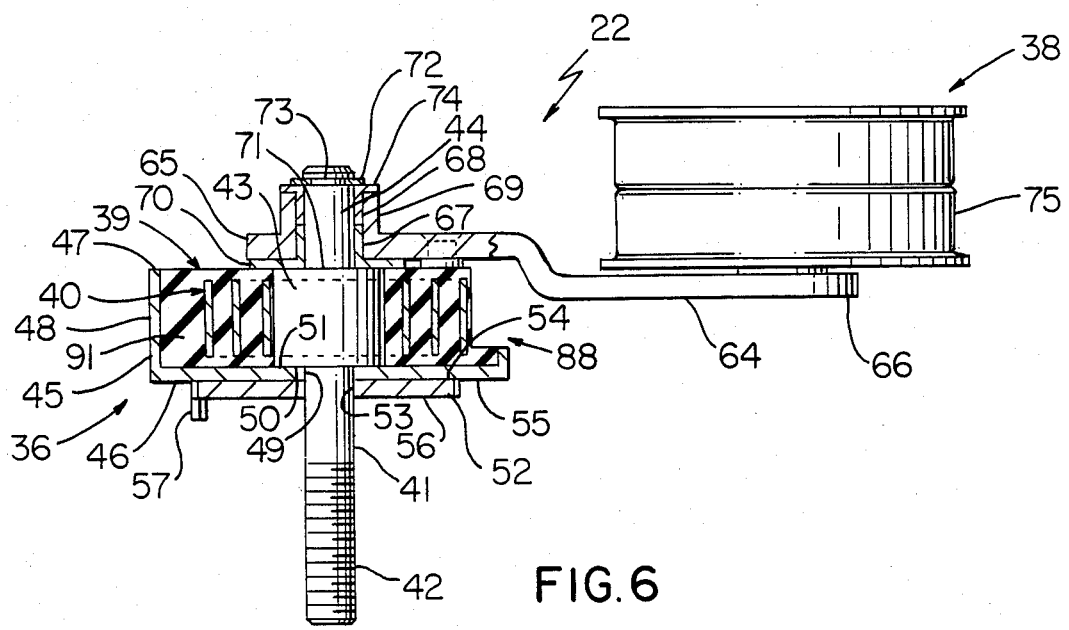
FIG. 6 is a partial cross-sectional view taken on line 6—6 of FIG. 3.

The belt engaging means 38 includes a lever arm 64 having opposed ends 65 and 66, the end 65 being adapted to be rotatably mounted on the end 44 of the shaft 41 by receiving a pair of bearing means 67 and 68 through a tubular part 69 thereof with the bearing means 67 having a disc-like flange 70 thereof bearing against the side 71 of the shaft enlargement 43 as illustrated in FIG. 6. The bearing means 67 and 68 are held on the end 44 of the shaft 41 by a C-clip 72 being received in a suitable annular groove 73 in the end 44 of the shaft 41 and being disposed against a disc-like flange 74 of the bearing member 68. In this manner, the end 65 of the lever arm 64 is pivotally mounted on the end 44 of the shaft 41 so as to be freely rotatable thereon.

The belt engaging means 38 includes an idler pulley 75 adapted to be rotatably mounted on a shaft extension 76 of the end 66 of the lever arm 64 by receiving the shaft extension 76 through an opening 77 thereof and being held adjacent a bearing surface 78 of the lever arm 64 by a C-clip 79 received in an annular groove 80 of the shaft extension 76 so as to be engagable in a bearing relationship against the side 81 of the pulley 75. In this manner, the pulley 75 is adapted to engage against the belt 21 while being freely rotated thereby on the shaft extension 76 in a manner well known in the art.

The mechanical spring means 40 comprises a metallic torsion spring member 82 having opposite ends 83 and 84, the end 83 being an inner end and being bent to be received in a slot 85 in the shaft enlargement 43 whereby the end 83 of the spring 82 is operatively interconnected to the shaft 41 and, thus, to the support means 36.

The other end 84 of the torsion spring 82 is looped so as to be disposed partly around a pin 86 carried by the lever arm 64 intermediate the ends 65 and 66 thereof and being secured in a suitable opening 87 thereof in any suitable manner whereby the end 84 of the torsion spring 82 is operatively interconnected to the lever arm 64 and, thus, to the belt engaging means 38 for a purpose hereinafter set forth.

The end 84 of the torsion spring 82 partly extends out of a cutout 88 formed in the side wall means 48 of the cup-shaped housing member 45 with the cutout 88 defining a pair of opposed stop surfaces 89 and 90 to limit movement of the lever arm 64 by having the end 84 of the spring 82 engage against the stops 89 and 90 as fully set forth in applicant's copending patent application Ser. No. 391,643, filed June 25, 1982 whereby this copending patent application is being incorporated into this disclosure by this reference thereto.

Figure 7:
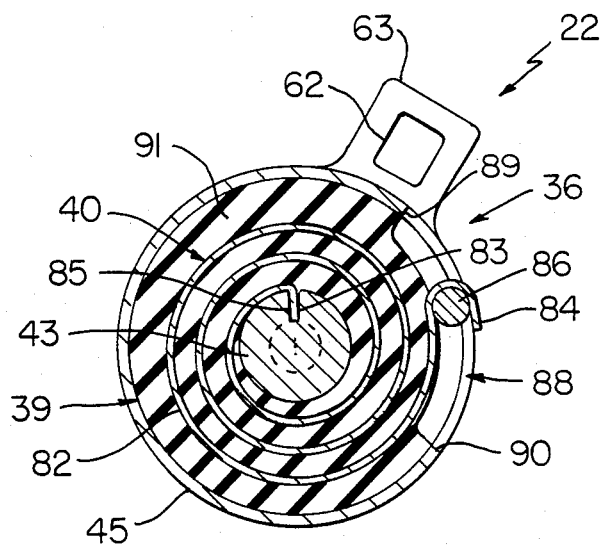
FIG. 7 is a cross-sectional view taken on line 7—7 of FIG. 4.
Figure 8:
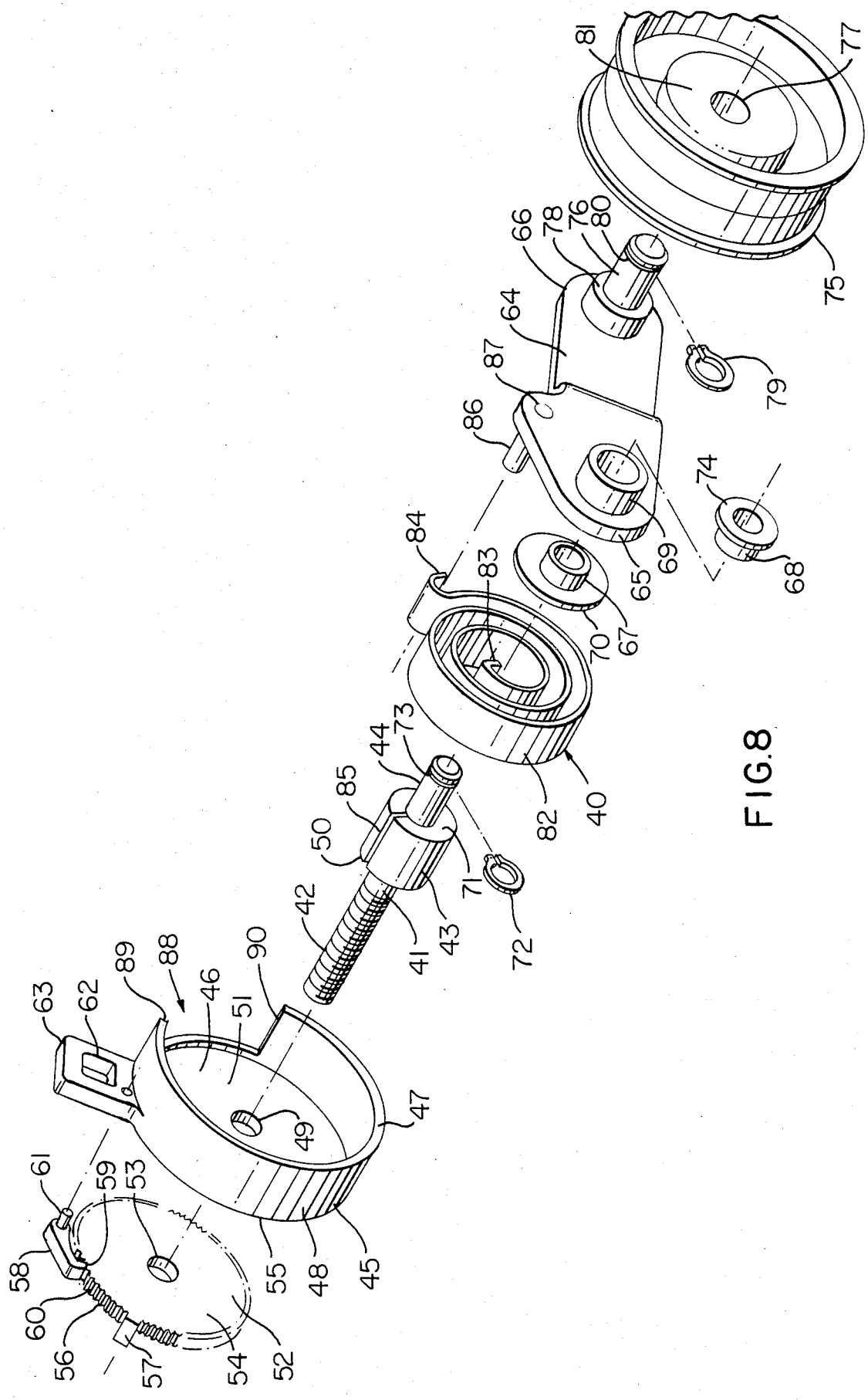
FIG. 8 is an exploded perspective view of the various parts of the belt tensioner of FIGS. 3–7.

After the mechanical spring means 40 has been disposed in the housing 45 and has its inner end 83 interconnected to the shaft 41 with the cup-shaped housing member 45 having been secured to the shaft enlargement 43 as previously described, the polymeric spring means 39 can be formed by casting a suitable mass of polymeric material 91 through the open end 47 of the housing 45 to fill the housing 45 as illustrated in FIGS. 6 and 7 so that when the mass of polymeric material 91 subsequently solidifies and is cured, if desired, the same has substantially completely embedded the mechanical spring means 40 therein except for the end 84 which is free to be carried by the pin 86 of the lever arm 64 within a cutout region 92 of the mass of material 91 between the stops 89 and 90 as will be apparent hereinafter.

In this manner, even though the mass of polymeric material 91 is, in essence, secured to the shaft 41 and to the cup-shaped housing 45 through its own adhesive properties, or by the use of additional adhesive means if desired, it can be seen that the polymeric material 91 is operatively interconnected to the support means 36 and is operatively interconnected to the belt engaging means 38 solely by the mechanical spring means 40 having its end 84 operatively interconnected to the belt engaging means 38 through the pin 86 as will be apparent hereinafter.

In view of the above, it can be seen that the tensioner 22 of this invention can be made in a relatively simple manner from a relatively few parts by the method of this invention to be operated in a manner now to be described.

When the support means 36 is initially secured to the mounting bracket 37 of the engine 20, the housing 45 and shaft 41 are adjusted relative to the support means 37 in the manner previously described so that the polymeric spring means 39 and mechanical spring means 40 tend to hold the lever arm 64 at approximately a 6 o'clock position when viewing the front of the engine as illustrated in FIG. 2. In this manner, the lever arm 64 must be rotated in a counterclockwise direction toward the 3 o'clock position thereof when viewing the engine in the direction of FIG. 2 in order to place the pulley 75 against the belt 21 as illustrated in FIGS. 1 and 2. Such counterclockwise rotation of the lever arm 64 causes the pin 86 to carry the end 84 of the spring member 82 therewith in a counterclockwise direction and cause the coils of the spring 82 to wind tighter together and thereby provide a torsional force tending to drive the pin 86 downwardly in a clockwise direction whereby the mechanical spring means 40 provides a force tending to urge the belt engaging means 38 and, thus, the pulley 75 against the belt 21 with a tensioning force. In addition, such torsional winding of the spring member 82 causes the polymeric spring means 39 to likewise be placed under a torsional force tending to unwind in a direction that causes the belt engaging means 38 to move in a clockwise direction so that the force of the polymeric spring means 39 adds to the torsional force of the mechanical spring means 40 to define the tensioning force on the belt 21, the polymeric material 91 also being placed under compression between the tightened coils of the spring member 82 so that this compressive force is added to the tensioning force on the belt 21.

During the running of the engine 20, should the belt 21 vibrate or oscillate so that the belt 21 tends to move the belt engaging means 38 in a counterclockwise direction as illustrated in FIGS. 1 and 2, such movement of the belt engaging means 38 tends to cause the torsion spring 82 and polymeric material 91 to increase its torsional force tending to retard such movement and any oscillation of the belt 21 in a direction away from the belt engaging means 38 causes the belt engaging means 38 to follow the same through the combined force of the polymeric spring means 39 and mechanical spring means 40.

It is believed that in addition, the polymeric material 91 tends to dampen the winding and unwinding of the coils of the mechanical spring member 82 to tend to dampen the oscillations of the belt 21 for the reasons fully set forth in the aforementioned copending patent application Ser. No. 402,404, filed July 27, 1982 of Billy L. Speer et al so that the polymeric material 91 performs a dual function, namely, adds its spring force to the spring force of the mechanical spring means 40 in providing the tensioning force for the belt 21 and tends to dampen oscillations of the belt 21 by dampening the coiling or uncoiling of the torsion spring member 82 to thereby tend to extend the life of the tensioner 22.

In this manner, it is believed that as the deflection of the belt 21 increases so does the dampening rate of the tensioner 22 and the polymeric material 91 offers such dampening with no wear and also exerts its spring force as previously described. This dampening force is believed to be particularly high when the material 91 is loaded so that a rotary shear takes place as in the tensioner 22 of this invention.

Therefore, it can be seen that this invention not only provides an improved tensioner for an endless power transmission belt or the like, but also this invention provides an improved method of making such a tensioner or the like.

While the form and method of this invention now preferred have been illustrated and described as required by the Patent Statute, it is to be understood that other forms and method steps can be utilized and still fall within the scope of the appended claims.

What is claimed is:

1. In a tensioner for a power transmission belt or the like that is adapted to be operated in an endless path, said tensioner comprising a support means for being fixed relative to said belt, a belt engaging means carried by said support means and being movable relative thereto, said belt engaging means including a lever arm having opposed ends, polymeric spring means being operatively associated with said support means and said belt engaging means for urging said belt engaging means relative to said support means and against said belt with a force to tension said belt, and coiled mechanical spring means also being operatively associated with said support means and said belt engaging means for urging said belt engaging means relative to said support means and against said belt with a force to tension said belt whereby said polymeric spring means and said mechanical spring means combine to define the tensioning force for said belt while said polymeric spring means additionally tends to dampen the movement of said belt engaging means relative to said support means, said mechanical spring means being substantially completely embedded in said polymeric spring means so that said mechanical spring means is substantially completely engaged and surrounded by said polymeric spring means, said coiled mechanical spring means having opposed ends, the improvement wherein one of said ends of said mechanical spring means extends out of said polymeric spring means and is operatively interconnected to said lever arm intermediate said opposed ends thereof whereby said polymeric spring means is operatively interconnected to said belt engaging means solely by said one end of said mechanical spring means.

2. A tensioner as set forth in claim 1 wherein said mechanical spring means comprises a torsion spring.

3. A tensioner as set forth in claim 2 wherein said torsion spring has the other of said ends thereof operatively interconnected to said support means.

4. A tensioner as set forth in claim 3 wherein said support means comprises a shaft and a housing surrounding at least part of said shaft.

5. A tensioner as set forth in claim 4 wherein one of said ends of said lever arm is rotatably mounted to said shaft.

6. A tensioner as set forth in claim 5 wherein said other of said ends of said torsion spring is operatively interconnected to said shaft.

7. A tensioner as set forth in claim 6 wherein said polymeric spring means has opposite ends, one of said ends of said polymeric spring means being operatively interconnected to said shaft, the other of said ends of said polymeric spring means being operatively interconnected to said housing.

8. A tensioner as set forth in claim 7 wherein said torsion spring is disposed in a coiled manner about said shaft and said polymeric material comprises a mass surrounding said shaft and extending from said shaft to said housing.

9. In a method of making a tensioner for a power transmission belt or the like that is adapted to be operated in an endless path, said method comprising the steps of providing a support means for being fixed relative to said belt, providing a belt engaging means to be carried by said support means and be movable relative thereto, forming said belt engaging means to include a lever arm having opposed ends, operatively associating polymeric spring means with said support means and said belt engaging means for urging said belt engaging means relative to said support means and against said belt with a force to tension said belt, operatively associating coiled mechanical spring means also with said support means and said belt engaging means for urging said belt engaging means relative to said support means and against said belt with a force to tension said belt whereby said polymeric spring means and said mechanical spring means combine to define the tensioning force for said belt while said polymeric spring means additionally tends to dampen the movement of said belt engaging means relative to said support means, and substantially completely embedding said mechanical spring means in said polymeric spring means so that said mechanical spring means is substantially completely engaged and surrounded by said polymeric spring means, the improvement comprising the steps of extending one of the opposed ends of said mechanical spring means out of said polymeric spring means, and operatively interconnecting said one end of said mechanical spring means to said lever arm intermediate said opposed ends thereof whereby said polymeric spring means is operatively interconnected to said belt engaging means solely by said mechanical spring means.

10. A method of making a tensioner as set forth in claim 9 and including the step of forming said mechanical spring means to comprise a torsion spring.

11. A method of making a tensioner as set forth in claim 10 and including the step of operatively interconnecting the other of said ends of said torsion spring to said support means.

12. A method of making a tensioner as set forth in claim 10 and including the step of forming said support means to comprise a shaft and a housing surrounding at least part of said shaft.

13. A method of making a tensioner as set forth in claim 12 and including the step of rotatably mounting one of said ends of said lever arm to said shaft.

14. A method of making a tensioner as set forth in claim 13 and including the step of operatively interconnecting said other of said ends of said torsion spring to said shaft.

15. A method of making a tensioner as set forth in claim 14 and including the steps of forming said polymeric spring means to have opposite ends, operativey interconnecting one of said ends of said polymeric spring means to said shaft, and operatively interconnecting the other of said ends of said polymeric spring means to said housing.

16. A method of making a tensioner as set forth in claim 15 and including the steps of disposing said torsion spring in a coiled manner about said shaft, and forming said polymeric spring means to comprise a mass surrounding said shaft and extending from said shaft to said housing.

* * * * *